May 7, 1940.　　　M. L. GOLDBERG　　　2,200,168
REFLECTOR DEVICE FOR INDICATING THE POSITION OF A CAR
Filed May 16, 1939
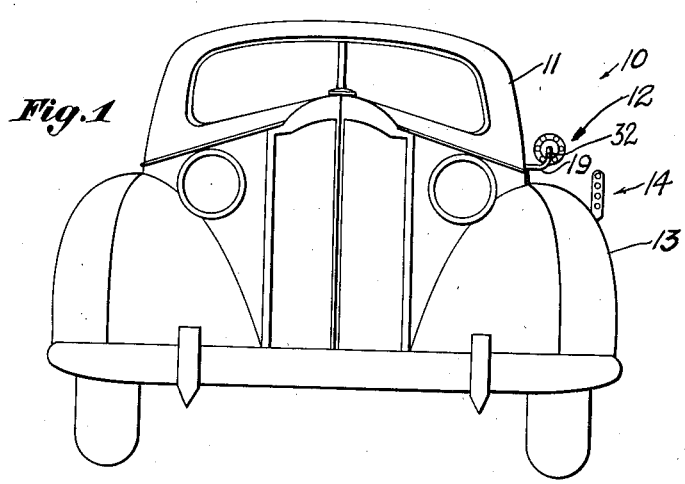
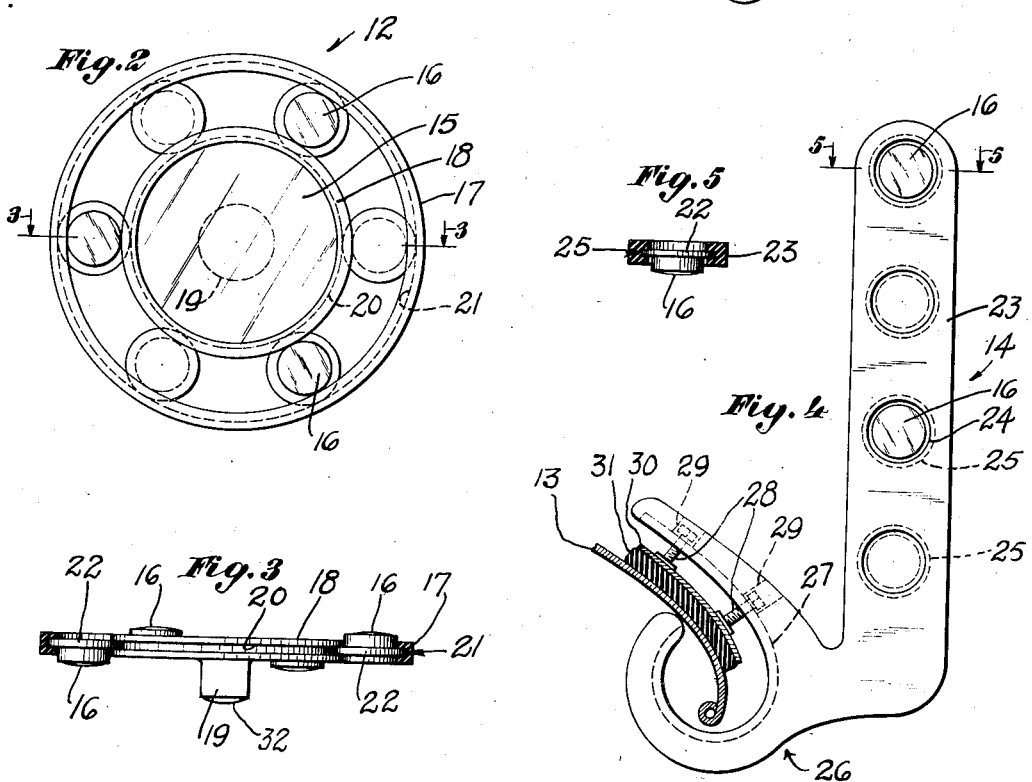
INVENTOR.
Morris L. Goldberg
BY
　　　　Schumacher
ATTORNEY.

Patented May 7, 1940

2,200,168

UNITED STATES PATENT OFFICE 2,200,168

REFLECTOR DEVICE FOR INDICATING THE POSITION OF A CAR

Morris L. Goldberg, Kiamesha, N. Y.

Application May 16, 1939, Serial No. 273,858

1 Claim. (Cl. 88—81)

This invention relates to devices such as indicators for indicating the location or width of an automobile in night driving so as to clearly show the clearance available when two cars are passing each other.

One object of the invention is to provide a device of the character described having improved means for indicating clearance space between cars regardless whether the same are passing each other in the same or in opposite directions.

Another object of the invention is the provision of an improved device of the nature set forth which shall combine the benefits of an external rear view mirror with the advantages of means for indicating to a driver the clearance space available for passing in the same or in an opposite direction a car carrying said indicator.

Another object of the invention is to furnish a device of the type referred to having improved means consisting of few and simple parts, adapted to be readily made and assembled, at low cost, on a quantity production basis, and adapted to provide a relatively small, neat and compact device, which is durable, reliable, and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claim, and illustrated in the annexed drawing, wherein like parts are designated by the same reference characters throughout the several views.

In the drawing:

Figure 1 is a view in front elevation showing an automobile with the improvements applied thereto schematically shown.

Fig. 2 is an enlarged view in front elevation of a device embodying the invention, with parts of the supporting bracket removed.

Fig. 3 is a sectional view approximately on the line 3—3 of Fig. 2.

Fig. 4 is an enlarged view in front elevation showing a device embodying the invention, according to another of the improvements herein disclosed.

Fig. 5 is a sectional view on the line 5—5 of Fig. 4.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device embodying the invention. The same may comprise any vehicle, such as an automobile 11, having applied to a side thereof, for instance, on the door hinge in a conventional manner, a device 12. Mounted on a fender 13 of the car is a device 14 which embodies another phase of the invention. Both of the devices are thus external of the car and are desirably mounted as far out as feasible. Both devices 12 and 14 have the common purpose of indicating the location or width of the car so that the motorist of another car, while driving in the same or an opposite direction, shall readily perceive in night driving the available clearance for the two cars to safely pass each other. However, the device 12 has the additional function of serving as a rear view mirror as hereinafter described. It may be mentioned that either device 12 or 14 may be used without the other, although the best results are attained by using both. Further, it will be perceived that the devices 12 and 14 may be mounted at one or at both sides of the car.

Referring in detail to the device 12, the same may comprise a rear view mirror 15 and a plurality of reflector elements 16 disposed along an edge thereof and lying generally along the plane of the mirror, to provide a unitary device. The mirror 15 and the reflector elements 16 may be of any suitable types for the purposes stated; for example, the reflectors 16 may be adapted for light dispersion in any well known manner, as by having irregular or convex surfaces or by having a light dispersion surface back of a transparent member. Certain of these reflector elements face forward and others face rearward as indicated by the shade lines. Any desired number of these reflector elements may be used, and desirably alternate elements face in opposite directions. Preferably the reflector elements are spaced around the periphery of the rear view mirror. To retain the latter and the elements in unitary relation to each other, a clamping band 17 may extend so as to lie in the plane of the mirror and secure the elements 16 between the band and mirror, as hereinafter described.

The rear view mirror 15 may have a frame 18 to which may be suitably connected the bracket 19 for mounting the mirror on the side of the car. Formed in the frame 18 is a securing means, such as an annular groove 20 for engaging or seating the reflector elements 16 at their inner edges. Extending around the series of reflector elements is the endless band 17 which may have an inner groove 21 of annular form, confronting the groove 20. The band 17 may be made of any suitable material, but preferably consists of rubber so as to be elastic and expansible. While the reflector elements 16 may be variously constructed, they are preferably formed with annular lips or flanges 22 remote from their reflector faces. The device 12 may thus be easily assembled by snapping the successive reflector elements in place, so that the lip 22 of each engages in both grooves 20 and 21, with the band 17 tensioningly engaging around the reflector elements and frictionally yieldingly holding the same in set position.

The device 14 may comprise a frame 23 of any suitable material, preferably rubber, and is of elongated form and provided with a series of openings 24 to receive reflector elements 16, whose lips 22 snap into grooves 25 formed annularly in the openings. As in the device 12, alternate reflector surfaces face forward and rearward. Formed integrally with the frame 23 is a clamp 26 in which there may be embedded a reenforcing curved strip of steel 27, threaded for the set screws 28, the heads of which may be received in the countersinks 29. These set screws may bear on a plate 30 having a facing of rubber 31 to engage the fender 13 without marring the finish of the car.

In use, the driver of the car, if another car at the rear is attempting to pass him, will have his eyes attracted by the lighting up of the reflector elements 16 by the light from the passing car. The driver will thus exercise care and observe the passing car in the rear view mirror 15. If a driver is coming in the opposite direction, his head lights will illuminate the reflector elements 16 that face him, and hence the driver will readily note the location of the adjacent side of the car and the clearance necessary for passing. The same will apply to a driver coming in the same direction. In fact, a driver at the rear may instantly note by the light effect on the reflector elements whether the car ahead of him is beginning to make a turn. The device 14 possesses the advantage of being at the extreme outer side of the car so as to indicate with maximum accuracy the clearance space required for passing. If desired, an additional reflector element 32 may be mounted on the front of the upright arm of the bracket 19 for use in the event that the device 12 has been removed.

I claim:

A night driving indicator for automobiles including a rear view mirror, a frame means therefor extending around the periphery of the mirror, an elastic ring means, reflector means including a plurality of separate reflector elements, the different means and the mirror lying in a common plane, certain of the reflector elements facing in one direction relatively to the plane and others of the reflector elements facing in an opposite direction, the reflector elements forming an annular series lying between the inner edge of the ring means and the outer edge of the frame means with the ring means being contracted around the reflector elements to press the latter inward against the frame means, formations extending around the outside of the frame means and around the inside of the elastic ring means in engagement with formations extending from the periphery of the reflector elements, these formations being in the shape of grooves and ridges engaged in the grooves to removably engage the reflector elements at their inner edges with the frame means and at their outer edges with the ring means to thus prevent the reflector elements from lateral accidental removal, said grooves and ridges lying in said plane, and the grooves and ridges being so formed on the several means as to be continuous on the frame and ring means and in part on the individual reflector elements, whereby the latter may be positioned at any desired points along the frame and ring means and in any desired angular position of the individual reflector elements.

MORRIS L. GOLDBERG.